Dec. 3, 1957   M. G. KAUFMAN   2,815,483
ELECTRIC FIELD DETECTION
Filed Nov. 17, 1954

Inventor
Maxime G. Kaufman

United States Patent Office 2,815,483
Patented Dec. 3, 1957

2,815,483

ELECTRIC FIELD DETECTION

Maxime G. Kaufman, Washington, D. C.

Application November 17, 1954, Serial No. 469,501

1 Claim. (Cl. 324—72)

This invention relates to the art of detecting the presence of an electrostatic field and has for its objective the modification of a mechanical field detector. This invention is directed toward achieving an improved output signal waveform. The output waveform of the conventional field detector is usually of a triangular type, requiring relatively wide bandwidth for amplification. The object of this invention is to, so shape the parts of the detector to cause the output signal waveform to be sinusoidal. This results in the advantage of narrow-banding with a proportionate increase in the signal to noise ratio.

A sine wave type signal output has other advantages, when used for feedback schemes in an attempt to cancel the ambient static field about such a detector, or in the case where the polarity of the field is to be compared to a standard. This is due to the low harmonic content of the sine wave so generated.

The foregoing discussion can be further explained upon reference to the following description, when read in connection with the accompanying drawing, in which.

Figure 1:
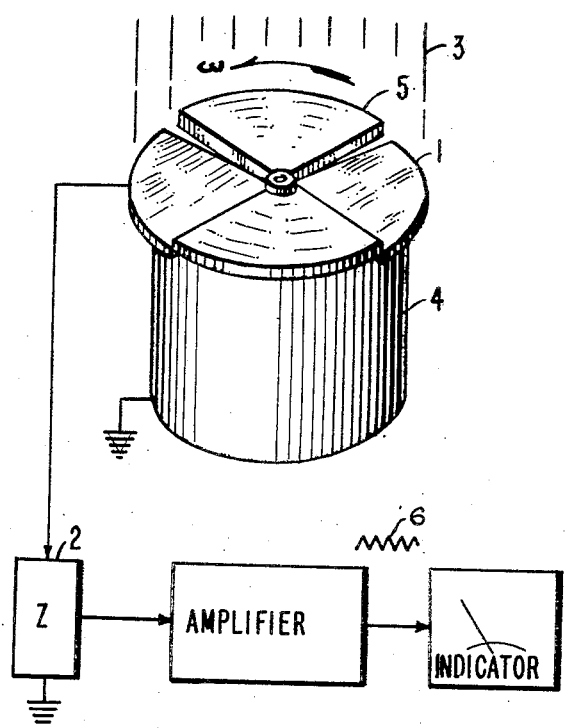
Figure 1 shows a drawing of a typical mechanical electrostatic field detector having pie-shaped stator and rotor plates.

The basic principle of the mechanical electrostatic voltmeter is as follows: With reference to Fig. 1, consider a stator plate 1 of area A connected to ground through an impedance 2, the stator plate 1 being alternately shielded from the impinging electrostatic field 3 by a motor 4 driving the rotor plate 5. This action will cause a flow of charge equal to $\pm KEA$ through the impedance 2. Where E is the field 3 and K is a proportionality constant. The magnitude of this alternating potential will be proportional to the field 3 for any given geometric shape of the instrument. The rate of rotation is usually high compared to the input time constant of the amplifier circuit following the device. Associate equipment to this instrument includes an amplifier and a recording pen, or meter. Calibration is obtained by locating the device in a known electric field between two plates of metal. The signal output waveform 6 from this device has a triangular shape and its harmonic composition is as follows:

$$y = 8/\pi^2 V (\cos x + 1/9 \cos 3x + 1/25 \cos 5x + \ldots)$$

The possibility of improvement of the ratio of signal intensity to noise intensity can be improved by a departure from the original design of the electrostatic voltmeter. Briefly this is done by designing the apparatus so that the area is exposed sinusoidally by the rotating chopper plate 5. The signal output from the modified voltmeter now occupies the minimum frequency range necessary for transmission of the signal intelligence and the selectivity of the circuit following this device can be such as to pass this signal frequency range freely, but suppresses disturbances of all other frequencies, no further improvement in the ratio of signal to random noise can be hoped for, except of course, by increasing the intensity of the electrostatic field.

Figure 2:
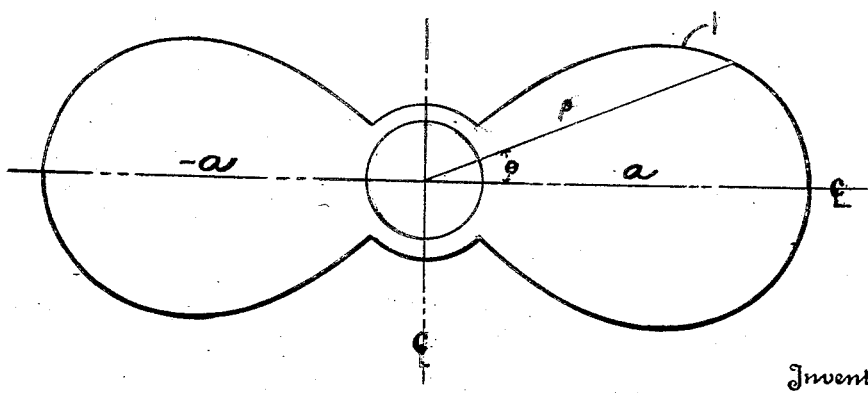
Figure 2 shows a drawing of the modified stator plate which causes the output to be more sinusoidal.

The new design of the stator plate 1 is shown in Figure 2. Its contour follows the two-leaved rose lemniscate of Bernoulli which can be expressed mathematically as:

$$P^2 = a^2 \sin 2\theta$$

This particular configuration for the stator plate will have a sine wave signal output when chopped by a pair of 90° pie sector shaped rotor plates, as shown in Figure 1, labeled 5.

The output signal frequency can be increased by increasing the speed of rotation, for any given speed of rotation. On the other hand, the frequency can be changed by designing the stator plate according to the general equation:

$$p = a \sin n\theta$$

this will require the rotor sectors to be reduced in size, correspondingly.

Although the foregoing has demonstrated several embodiments of generating desired output signal waveforms from a mechanical electrostatic field detector, it is understood that other modifications can be made without departing from the spirit and scope of the invention as defined in the appended claim.

I claim:

In an electrostatic field detector, means for generating a sine wave output with low harmonic content, comprising a stator plate for exposure to the field to be measured, said plate being shaped according to the lemniscate of Bernoulli, and a planar rotor parallel to and coaxial with the stator plate for rotation between the stator plate and the source of said field, said rotor having a diameter substantially equal to the diameter of the stator and comprising a pair of 90° pie sectors centered on the rotor axis and located on a diameter bisecting the sectors, and means for driving the rotor so as to alternately shield the stator plate from the impinging electrostatic field to be measured.

References Cited in the file of this patent

UNITED STATES PATENTS

| | | |
|---|---|---|
| 531,970 | Rowland | Jan. 1, 1895 |
| 2,201,388 | Curtis | May 21, 1940 |
| 2,423,100 | Handley | July 1, 1947 |
| 2,587,156 | Havenhill | Feb. 26, 1952 |

FOREIGN PATENTS

| | | |
|---|---|---|
| 168,775 | Switzerland | Aug. 1, 1934 |